United States Patent Office 3,108,979
Patented Oct. 29, 1963

3,108,979
EMULSION POLYMERIZATION WITH AMINO ALCOHOL ESTERS AS CATIONIC COMONOMERS
Walter J. Le Fevre and David P. Sheetz, Midland, Mich., assignors to The Dow Chemical Company, Midland, Mich., a corporation of Delaware
No Drawing. Filed Oct. 21, 1957, Ser. No. 691,169
16 Claims. (Cl. 260—29.6)

This invention concerns an improved process and composition for aqueous emulsion polymerization of polymerizable ethylenically unsaturated compounds to obtain very stable aqueous colloidal dispersions of polymers. It particularly concerns the preparation of stable aqueous colloidal dispersions of polymeric products that comprise a small but appreciable proportion of a salt of an amino alcohol ester of an α-methylene carboxylic acid as a polymerically bound cationic stabilizer.

In the well-known art of emulsion polymerization, a monomeric, usually water-insoluble, liquid composition comprising a polymerizable, ethylenically unsaturated compound, such as styrene, butadiene, methyl methacrylate, ethyl acrylate, vinyl acetate, vinyl chloride, or vinylidene chloride, or certain mixtures thereof, is colloidally emulsified in an aqueous medium that usually contains a wetting agent or surfactant, such as a water-soluble alkali soap, and a polymerization catalyst such as potassium persulfate. The resulting colloidal emulsion is then subjected to conditions conducive to polymerization of the monomeric constituents to produce an aqueous colloidal dispersion of the corresponding polymeric product, the aqueous colloidal dispersion being commonly called a latex.

The stability of the resulting polymer latex (aqueous colloidal dispersion) against coagulation or precipitation of its polymer ingredient depends at least in part upon the kind and amount of surfactants and the like that are contained in the aqueous suspending medium. In many instances, the dispersions are quite unstable, particularly when subjected to mechanical agitation, to heat or cold, or upon addition to the dispersion of polyvalent ions such as ionized calcium salts, such influences causing coagulation of the polymer particles. In some instances, the stability of the latex can be improved by adding further amounts of surfactants or other stabilizers to the colloidal dispersions after completion of the polymerization step. However, latexes stabilized with external surfactants are stable only to a limited degree and are more or less vulnerable to external destabilization.

Moreover, in many instances and for many purposes the conventionally-employed water-soluble surfactants and stabilizers (added to increase the latex stability) are ultimately objectionable. For example, in coatings derived from aqueous latexes by evaporation of water from a layer of such latex, the non-volatile surfactants remain together with the polymer deposit; in many instances the water-soluble ingredients of the coating seriously and deleteriously affect the quality of the coating.

Many uses of aqueous colloidal dispersions of polymers make seemingly contradictory demands, namely (1) that the dispersions be stable, and (2) that the dispersions contain as little water-soluble material as possible.

It is an object of this invention to provide a process, and compositions therefor, for aqueous emulsion polymerization whereby to obtain stable aqueous colloidal dispersions of solid polymeric materials.

A further object is to provide such a process, and compositions therefor, whereby to obtain stable polymer dispersions that contain only small proportions of water-soluble constitutents.

Other objects and advantages of the invention will be evident in the following description.

The objects of this inevntion have been attained in a method of emulsion polymerization, and compositions therefor, wherein the aqueous colloidal polymer dispersion comprises a small but appreciable proportion of a polymerizable, ethylenically unsaturated organic amine salt, particularly a salt of an amino alcohol ester of an α,β-ethylenically unsaturated carboxylic acid such as an α-methylene carboxylic acid, polymerically combined therein.

The process of this invention comprises mixing a substantially water-insoluble monomeric liquid composition comprising at least one polymerizable, ethylenically unsaturated compound (other than an amino compound), that is capable of undergoing addition polymerization to form substantially water-insoluble addition polymers, with a non-alkaline aqueous medium comprising a water-soluble salt of a polymerizable amino compound such as amino alcohol ester of an α-methylene carboxylic acid as defined below, and subjecting the resulting mixture to conditions conducive to emulsion polymerization.

It has now been discovered that when substantially water-insoluble polymeric products of ethylenically unsaturated compounds comprise amino alcohol esters of α-methylene carboxylic acids and are prepared in non-alkaline aqueous colloidal dispersion and in accordance with this invention, such polymer products are internally stabilized in the aqueous colloidal dispersion, and that the resulting dispersions are very stable, even without the presence therein of water-soluble surfactants and stabilizers. It may be suggested that the dispersions contain solid polymer particles in which the amino esters of α-methylene carboxylic acids are polymerically combined and in which the surface layer of the polymer particles contains such polymerically combined amino ester oriented in such a way as to present a plurality of cationic stabilizer groups to the ambient aqueous suspending medium. It is evident that the agent responsible for the stabilization of the dispersion is internally and securely bound in the solid colloidal polymer particles and is not merely externally and loosely attracted thereto.

The amino alcohol esters of α-methylene carboxylic acids whose salts are employed in practice of the present invention are representable by the formula

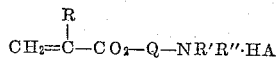

wherein the symbol R represents hydrogen, a halogen such as chlorine or bromine, or an organic radical such as an alkyl radical, the symbol —Q— represents an alkylene radical, i.e. a bivalent aliphatic radical having its valence bonds on different carbon atoms, the symbols R' and R'', being the same or different, represent hydrogen, hydrocarbon radicals, or substituted hydrocarbon radicals, e.g. saturated or unsaturated acyclic or cyclic radicals such as methyl, ethyl, cyclohexyl, benzyl, aminoethyl, ethylaminoethyl, and like radicals, including ones in which the group —NR'R'' constitutes a heterocyclic radical, the group —Q—NR'R'' being the residue of an amino monohydric alcohol, and the symbol HA represents a salt-forming acid. Among such amino alcohol esters are ones in which the amino group is a primary amino group, a secondary amino group, or a tertiary amino group.

Amino alcohol esters of this kind in which the amino group is a tertiary amino group are already known and are readily obtainable by interaction of the corresponding α-methylene carboxylic acid, acid chloride, or lower alkyl ester and the corresponding amino alcohol. For example, 2-dimethylaminoethyl methacrylate can be made by reaction of methacryloyl chloride and 2-dimethylaminoethanol or by transesterification of methyl methacrylate with 2-dimethylaminoethanol. These methods are not usually applicable to amino alcohols having primary or secondary amino groups (which form amides instead of or in addition to the desired ester) unless these amino groups are sterically hindered.

Amino alcohol esters of α-methylene carboxylic acids and amino alcohols in which the amino group has at least one hydrogen atom (i.e. a primary or secondary amino group), which amino group is not sterically hindered and is separated from the ester linkage by from 2 to 3 carbon atoms in an alkylene radical, are described in a copending application, Serial No. 691,134, filed October 21, 1957, by Walter J. Le Fevre and David P. Sheetz. Such esters are obtainable in accordance with that application in the form of hydrohalide salts by interaction of an α-methylene carboxylic acid halide and the hydrohalide salt of an amino aliphatic alcohol.

Specific examples of α-methylene carboxylic acids whose esters are contemplated in the practice of this invention are acrylic acid, methacrylic acid, α-ethylacrylic acid, α-propylacrylic acid, α-butylacrylic acid, α-pentylacrylic acid, α-hexylacrylic acid, atropic acid, α-cyclohexylacrylic acid, α-furylacrylic acid and α-chloroacrylic acid.

Specific examples of amino alcohols whose esters are contemplated in the practice of this invention are 2-aminoethanol, 3-aminopropanol, 1-amino-2-propanol, 2-amino-2-methylpropanol, 2-aminobutanol, 3-aminobutanol, 3-amino-2-butanol, 3-amino-3-methyl-2-butanol, 2-methylaminoethanol, 2-dimethylaminoethanol, 2-ethylaminoethanol, 2-diethylaminoethanol, 3-methylaminopropanol, 3-dimethyaminopropanol, 3-ethylaminopropanol, 3-dimethylaminopropanol, 1-methylamino-2-propanol, 1-dimethylamino-2-propanol, 1-ethylamino-2-propanol, 1-diethylamino-2-propanol, 3-methylaminobutanol, 3-dimethylaminobutanol, 3-ethylaminobutanol, 3-diethylaminobutanol, 3-methylamino-2-butanol, 3-dimethylamino-2-butanol, 3-ethylamino-2-butanol, 3-diethylamino-2-butanol, 2-(2-aminoethylamino)ethanol, N-(2-hydroxyethyl)piperidine, 2-aminocyclohexanol, 2-methylaminocyclohexanol, 2-dimethylaminocyclohexanol, 2-benzylaminoethanol, and α-aminomethylbenzyl alcohol.

The terms "aminoalcohol ester" and "aminoalcohol ester of α-methylene carboxylic acid" employed herein designate esters of α-methylene carboxylic acids and amino monohydric alcohols according to the foregoing description.

In the practice of this invention, the amino alcohol esters of α-methylene carboxylic acids are employed in the form of their water-soluble salts, preferably salts of the hydrogen halides, such as hydrochloric acid and hydrobromic acid, and salts of acids such as sulfuric acid and toluenesulfonic acid.

There are many known polymerizable, ethylenically unsaturated compounds that can be polymerized while dispersed in aqueous media by means already known per se to produce aqueous colloidal dispersions of substantially water-insoluble solid polymer products. These can now be advantageously polymerized in aqueous dispersions that comprise one of the aminoalcohol esters of the class defined above in accordance with this invention.

Among such other known polymerizable ethylenically unsaturated compounds are the alkenyl-aromatic compounds, i.e. the styrene compounds, the derivatives of ethylenically unsaturated acids such as the acrylic esters, acrylic nitriles, maleic esters, and unsaturated alcohol esters, and unsaturated ketones, unsaturated ethers, and other compounds containing one or more ethylenic linkages capable of addition polymerization. Specific examples of such ethylenically unsaturated compounds are styrene, α-methylstyrene, ar-methylstyrene, ar-ethylstyrene, α,ar-dimethylstyrene, ar,ar-dimethylstyrene, vinylnaphthalene, hydroxystyrene, methoxystyrene, cyanostyrene, acetylstyrene, mono-chlorostyrene, dichlorostyrene and other halostyrenes, methyl methacrylate, ethyl acrylate, butyl acrylate, hexyl acrylate, lauryl methacrylate, phenyl acrylate, acrylonitrile, methacrylonitrile, acrylanilide, ethyl α-chloroacrylate, ethyl maleate, polyglycol maleate, vinyl chloride, vinyl bromide, vinylidene chloride, vinylidene bromide, vinyl methyl ketone, methyl isopropenyl ketone, vinyl ethyl ether, 1,3-butadiene, isoprene, and the like.

The improved process of polymerization according to this invention comprises preparing an aqueous composition comprising a non-alkaline, e.g. neutral to acidic, aqueous medium, one or more of the class of the water-soluble salts of amino alcohol esters of α-methylene carboxylic acids, and one or more of the class of other polymerizable ethylenically unsaturated compounds that are capable of forming substantially water-insoluble addition polymers.

The invention contemplates that the aqueous composition may optionally contain conventional emulsifiers, wetting agents, surfactants, and the like, although such constituents can be omitted from the starting composition and, if used, can usually be employed in smaller proportions in accordance with this invention than is possible with known processes.

The invention contemplates that the aqueous starting composition comprising the polymerizable material may contain polymerization catalysts of kinds already known to promote emulsion polymerizations. Among such catalysts are water-soluble oxidizing agents such as hydrogen peroxide and potassium persulfate and catalysts which, like the redox catalysts, are activated in the water-phase, e.g. by a water-soluble reducing agent. A particularly desirable catalyst system comprises hydrogen peroxide and ferric ions in an aqueous medium having a pH value not greater than 3. The starting composition may include acids or salts to provide a desired pH value and possibly a buffered system.

The advantages of the present invention are attained when the starting aqueous composition comprises from 0.1 to 10, preferably from 0.5 to 5, parts by weight of an aminoalcohol ester of an α-methylene carboxylic acid per 100 parts by weight of the other polymerizable ethylenically unsaturated constituents of the composition. The other constituents of the starting composition can be employed in usual proportions already known in this art. For example, the starting aqueous composition usually contains from 5 to 60 percent by weight of the polymerizable constituents and correspondingly from 95 to 40 percent by weight of the aqueous medium, although proportions outside of these ranges can be used.

The starting composition as described above is subjected to conditions conducive to polymerization of the polymerizable constituents. In most instances the starting composition is agitated and the temperature is raised, e.g. to a temperature in the range from 40° C to 100° C. to activate the polymerization, although in some instances, particularly those wherein the composition comprises a very active polymerization catalyst, the polymerization can occur at or below room temperature. Other means, such as exposure of the composition to activating radiations, can be employed to promote polymerization of the polymerizable constituents.

The invention contemplates embodiments in which all of the constituents are charged to the starting mixture, and are polymerized therein in a single step, as well as embodiments in which the constituents are charged in a sequence, perhaps coordinated with a polymerization sequence, and/or the polymerization is carried out in plurality of stages. The amino alcohol ester of the α-methylene carboxylic acid can advantageously be added to the polymerization reaction mixture prior to the polymerization step or at any time prior to the complete polymerization of the polymerizable constituents.

When the compositions comprising a salt of an amino alcohol ester of an α-methylene acrboxylic acid and a different polymerizable ethylenically unsaturated compound dispersed in an aqueous medium are polymerized in accordance with this invention, there are obtained aqueous colloidal dispersions of polymeric products, commonly called synthetic polymer latexes or simply latexes, which contain the starting amino alcohol ester and other ethylenically unsaturated compound in polymerically combined form.

These aqueous dispersions are characteristically very stable, i.e. resistant to coagulation of the colloidally dispersed polymer particles, even though they contain little or no conventional emulsifier or stabilizer. In many instances, the polymer dispersions can be mixed with concentrated calcium chloride solutions without causing coagulation of the polymer. In many instances, the dispersion can be vigorously agitated without coagulation under conditions that cause substantial precipitation of ordinary dispersions. In instances where the dispersions contain little or no conventional water-soluble emulsifier, the dispersions often have little or no tendency to foam. When the polymer dispersions are obtained from starting compositions that were substantially free of water-soluble soaps, wetting agents, stabilizers, and like external solutes, the resulting polymer dispersions are likewise substantially free of such external solutes and are advantageously employed where such solutes are undesirable, e.g. in coatings that are resistant to water.

The latex products, i.e. aqueous polymer dispersions, obtained in accordance with this invention are useful for a number of purposes. For example, some of the latex dispersions are useful as, or in the preparation of, coating and impregnating compositions, or in the coating of films and the like. Other compositions can be treated, e.g. by spray or other drying, to obtain a dry polymeric product useful in molding or for other purposes. When small amounts of an amino alcohol ester of an α-methylene carboxylic acid are used, e.g. from 0.1 to approximately one part by weight per 100 parts by weight of a normally hydrophobic ethylenically unsaturated monomer such as styrene, the principal effect on the polymer dispersion is the unusual stability thereof. When larger amounts of the amino alcohol ester are used, e.g. from 5 to 10 parts by weight thereof per 100 parts by weight of the other ethylenically unsaturated monomer, the resulting dispersion contains a polymer which, when dried, is often readily redispersible in water.

The following examples illustrate the invention but are not to be construed as limiting its scope. In the examples, parts and percentages are by weight unless otherwise noted.

*Example 1*

Into a polymerization vessel was charged a mixture of 99 ml. of water, 1 ml. of 30 percent hydrogen peroxide, ferric nitrate equivalent to 0.25 milligram of iron, 2.5 g. of 2-aminoethyl acrylate hydrochloride, and 47.5 g. of styrene. The atmosphere in the vessel was purged with nitrogen, and the vessel was closed. The polymerization reaction mixture was agitated and heated at 70° C. for five hours.

The resulting polymerization product was a very stable, uniform fine particle latex, i.e. aqueous colloidal polymer dispersion, containing approximately 33 percent of a solid styrene polymer having the hydrochloride of 2-aminoethyl acrylate polymerically bound therein. This latex was very stable and could be diluted with strong electrolyte solution such as calcium chloride solution without coagulation. Upon evaporation of water from a thin layer of the latex, there remained a polymeric residue that was readily redispersible in water to reconstitute a latex of any desired concentration.

The 2-aminoethyl acrylate hydrochloride employed in this example was a portion of the product obtained by mixing 97 g. of ethanolamine hydrochloride and 100 g. of acryloyl chloride, heating that mixture at temperatures between 70° and 105° C. until evolution of hydrogen chloride ceased, cooling the residue reaction product, triturating the resulting waxy solid with ether, and recovering the crystalline hydrochloride salt of the amino ester.

*Example 2*

Into a polymerization vessel was charged a mixture of 99 ml. of water, 1 ml. of 30 percent hydrogen peroxide, ferric nitrate equivalent to 0.5 milligram of iron, 1 g. of 2-aminoethyl acrylate hydrochloride (prepared as described in Example 1), and 50 g. of vinylidene chloride. The atmosphere in the vessel was purged with nitrogen, and the vessel was closed. The polymerization reaction mixture was agitated and heated at 70° C. for 3.5 hours.

There was thereby obtained a very stable aqueous colloidal dispersion of a copolymer of vinylidene chloride containing the hydrochloride of 2-aminoethyl acrylate polymerically bound therein. This latex was very stable and could be diluted with strong electrolyte solutions such as calcium chloride solutions without coagulation of the colloidal polymer.

*Example 3*

Into a polymerization vessel was charged a mixture of 98 ml. of water, 2 ml. of 30 percent hydrogen peroxide, ferric nitrate corresponding to 0.2 milligram of iron, 0.7 g. of 2-aminoethyl methacrylate hydrochloride, 100 grams of styrene and enough dilute hydrochloric acid to render the aqueous phase of the mixture acidic to a pH value of 2.7. After the atmosphere in the vessel was replaced with nitrogen, the vessel was closed and heated with agitation at 70° C. for six hours.

There was thereby obtained a very stable aqueous colloidal dispersion containing about 50 percent of polystyrene stabilized with a small amount of the hydrochloride of 2-aminoethyl methacrylate polymercially combined therewith.

The 2-aminoethyl methacrylate employed in this example was a portion of the product obtained by mixing 1097 g. of methacryloyl chloride and 975 g. of ethanolamine hydrochloride, heating that mixture in the temperature range from 80° to 85° C. for ¾ hour until the evolution of hydrogen chloride ceased, and recrystallizing the resulting reaction product from ethylene dichloride.

*Example 4*

Into a polymerization vessel was charged a mixture of 98 ml. of water, 2 ml. of 30 percent hydrogen peroxide, ferric nitrate corresponding to 0.1 milligram of iron, 0.6 g. of 2-aminoethyl methacrylate hydrochloride (prepared as described in Example 3), 40 g. of methyl methacrylate, 60 g. of n-butyl acrylate, and dilute hydrochloric acid to render the aqueous phase of the mixture acidic to a pH value of 2.7. After the atmosphere in the vessel was replaced with nitrogen, the vessel was closed and heated with agitation at 70° C. for three hours.

There was thereby obtained a very stable aqueous latex containing about 50 percent of colloidally dispersed solid copolymer. When a thin layer of this latex was dried by evaporation of water on a solid supporting surface, there was obtained a clear, tough, continuous film or foil.

*Example 5*

Into a polymerization vessel was charged a mixture of 98 ml. of water, 2 ml. of 30 percent hydrogen peroxide, ferric nitrate equivalent to 0.2 milligram of iron, 0.7 g. of 2-ethylaminoethyl methacrylate hydrochloride, and 100 grams of styrene. After the atmosphere in the vessel was replaced with nitrogen, the vessel was closed and heated with agitation at 70° C. for 14 hours.

There was thereby obtained a very stable aqueous colloidal dispersion containing approximately 50 percent of a styrene polymer stabilized with a small amount of the hydrochloride of 2-ethylaminoethyl methacrylate polymerically combined therein.

The 2-ethylaminoethyl methacrylate hydrochloride employed in this example was a portion of the product obtained by mixing 125.5 g. of 2-ethylaminoethanol hydrochloride and 115 g. of methacryloyl chloride, heating that mixture on a steam bath until the evolution of hydrogen chloride ceased and the mixture became homogeneous, and crystallizing the resulting reaction product from ethylene dichloride.

*Example 6*

Into a polymerization vessel was charged a mixture of 98 ml. of water, 2 ml. of 30 percent hydrogen peroxide, 0.7 g. of 2-aminoethyl methacrylate hydrochloride (prepared as described in Example 3), ferric nitrate equivalent to 0.2 milligram of iron, dilute hydrochloric acid to bring the pH value of the aqueous phase to 2.7, 60 g. of styrene, and 40 g. of 1,3-butadiene. After the atmosphere in the vessel was replaced with nitrogen, the vessel was closed and heated with agitation at 70° C. for 14 hours.

There was thereby obtained a very stable aqueous colloidal dispersion containing approximately 49 percent of the styrene-butadiene copolymer in the form of colloidal particles having average diameters of 0.18 micron. The aqueous dispersion had no tendency whatever to foam, and a thin layer, dried on a solid supporting surface, deposited a clear, tough, continuous film.

Substantially the same results were obtained when the procedure of the preceding example was carried out on a starting composition that contained 2-dimethylaminoethyl methacrylate hydrochloride in place of the 2-aminoethyl methacrylate hydrochloride.

*Example 7*

Into a polymerization vessel was charged a mixture of 490 ml. of water, 10 ml. of 30 percent hydrogen peroxide, 3.5 grams of 2-aminoethyl methacrylate hydrochloride (prepared as described in Example 3), ferric nitrate equivalent to 2.0 milligrams of iron, dilute hydrochloric acid to bring the pH value of the aqueous phase to 2.7, 60 grams of styrene, and 40 grams of n-butyl acrylate. After the atmosphere in the vessel was replaced with nitrogen, the vessel was closed and heated with agitation at 70° C. for one hour.

There was thereby obtained a very stable aqueous colloidal dispersion containing approximately 16.7 percent of a styrene-n-butyl acrylate copolymer having a small amount of 2-aminoethyl methacrylate hydrochloride polymerically combined therein.

That which is claimed is:

1. In a method for making synthetic polymer latexes, the steps of forming an aqueous dispersion of a polymerizable ethylenically unsaturated monomeric material by mixing together as the only constituents, water in amount corresponding to from 40 to 95 percent by weight of the whole mixture, polymerization catalyst, from 0.1 to 10 parts by weight of a water-soluble salt of a monohydric amino alcohol ester of an α-methylene monocarboxylic acid having the formula

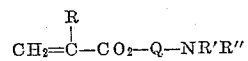

wherein R is selected from the group consisting of hydrogen and methyl and each of R' and R'' is individually selected from the group consisting of hydrogen, methyl and ethyl and Q is a divalent aliphatic hydrocarbon radical having its valence bonds on different carbon atoms, and 100 parts by weight of a water-insoluble ethylenically unsaturated liquid monomeric material that is capable of undergoing addition polymerization to form a water-insoluble solid polymer, and polymerizing the monomeric constituents by maintaining the resulting dispersion at polymerization temperatures between room temperature and approximately 100° C. to obtain a stable aqueous colloidal dispersion of a polymeric product comprising the monohydric amino alcohol ester of the α-methylene monocarboxylic acid in polymerically combined form.

2. A method according to claim 1 wherein the ethylenically unsaturated monomeric material comprises styrene.

3. A method according to claim 1 wherein the ethylenically unsaturated monomeric material comprises 1,3-butadiene.

4. A method according to claim 1 wherein the ethylenically unsaturated monomeric material comprises vinylidene chloride.

5. A method according to claim 1 wherein the ethylenically unsaturated monomeric material comprises an α-methylene monocarboxylic ester.

6. A method according to claim 1 wherein the monohydric amino alcohol ester of an α-methylene monocarboxylic acid is an acrylic acid ester.

7. A method according to claim 1 wherein the monohydric amino alcohol ester of an α-methylene monocarboxylic acid is a methacrylic acid ester.

8. A method according to claim 1 wherein a water-soluble salt of a monomeric monohydric amino alcohol ester of an α-methylene monocarboxylic acid is added to the aqueous dispersion prior to polymerizing the monomeric constituents.

9. A method of emulsion polymerization which comprises mixing as the only constituents a water-insoluble monomeric composition, consisting essentially of at least one ethylenically unsaturated compound capable of undergoing addition polymerization, and an acidic aqueous suspending medium consisting essentially of water, a polymerization catalyst and a water-soluble salt of a monohydric amino alcohol ester of an α-methylene monocarboxylic acid having the formula

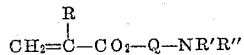

wherein R is selected from the group consisting of hydrogen and methyl and each of R' and R'' is individually selected from the group consisting of hydrogen, methyl and ethyl and Q is a divalent aliphatic hydrocarbon radical having its valence bonds on different carbon atoms, said salt of a monohydric amino alcohol ester of an α-methylene monocarboxylic acid being present in an amount corresponding to from 0.1 to 10 parts by weight per 100 parts by weight of the monomeric composition, agitating the resulting mixture, and polymerizing the monomeric constituents by maintaining the resulting dispersion at polymerization temperatures between room temperature and approximately 100° C. to obtain a stable aqueous colloidal dispersion of a polymeric product comprising the monohydric amino alcohol ester of the α-methylene monocarboxylic acid in polymerically combined form.

10. A method according to claim 9 wherein the acidic aqueous suspending medium contains hydrogen peroxide and ferric ions and has a pH value not greater than 3.

11. A stable aqueous colloidal dispersion consisting essentially of water and a colloidally dispersed, water-insoluble, solid addition polymer of from 0.1 to 10 parts by weight of a monohydric amino alcohol ester of an α-methylene monocarboxylic acid having the formula

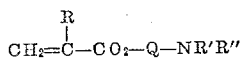

wherein R is selected from the group consisting of hydrogen and methyl and each of R' and R'' is individually selected from the group consisting of hydrogen, methyl and ethyl and Q is a divalent aliphatic hydrocarbon radical having its valence bonds on different carbon atoms and 100 parts by weight of at least one other ethylenically unsaturated compound.

12. A stable aqueous colloidal dispersion consisting essentially of water and a colloidally dispersed, water-insoluble, solid addition polymer of from 0.1 to 5 parts by weight of a monohydric amino alcohol ester of an α-methylene monocarboxylic acid having the formula

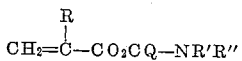

wherein R is selected from the group consisting of hydrogen and methyl and each of R' and R'' is individually selected from the group consisting of hydrogen, methyl and ethyl and Q is a divalent aliphatic hydrocarbon radical having its valence bonds on different carbon atoms and 100 parts by weight of at least one other ethylenically unsaturated compound, said monohydric amino alcohol ester being one in which the amino group has at least one hydrogen atom and is separated from the ester linkage by from 2 to 3 carbon atoms in an alkylene radical.

13. A stable aqueous colloidal dispersion according to claim 12 of a polymer of from 0.1 to 5 parts by weight of the amino alcohol ester and 100 parts of a mixture of 1,3-butadiene and styrene.

14. A stable aqueous colloidal dispersion according to claim 12 of a polymer of from 0.1 to 5 parts by weight of the amino alcohol ester and 100 parts of a mixture of vinylidene chloride and at least one ester selected from the group consisting of acrylic esters and methacrylic esters.

15. A stable aqueous colloidal dispersion according to claim 12 of a polymer of from 0.1 to 5 parts by weight of the amino alcohol ester and 100 parts of a mixture of acrylic and methacrylic esters.

16. A stable aqueous colloidal dispersion according to claim 12 of a polymer of from 0.1 to 5 parts by weight of the amino alcohol ester and 100 parts of a mixture of at least one mono-alkenylaromatic hydrocarbon and at least one ester selected from the group consisting of acrylic esters and methacrylic esters.

References Cited in the file of this patent

UNITED STATES PATENTS

| | | |
|---|---|---|
| 2,138,762 | Harmon | Nov. 29, 1938 |
| 2,300,920 | Heuer | Nov. 3, 1942 |
| 2,372,108 | Neher | Mar. 20, 1945 |
| 2,838,397 | Gruntfest | June 10, 1958 |
| 2,868,755 | Medalia | Jan. 13, 1959 |

FOREIGN PATENTS

| | | |
|---|---|---|
| 475,131 | Great Britain | Nov. 15, 1937 |
| 475,132 | Great Britain | Nov. 15, 1937 |
| 515,194 | Belgium | Nov. 14, 1952 |